United States Patent
Wedeking et al.

(10) Patent No.: US 10,571,001 B2
(45) Date of Patent: Feb. 25, 2020

(54) BELT RATCHETING SYSTEM WITH DUAL ROLLERS AND ADJUSTABLE RELEASE BUCKLE

(71) Applicant: Bestop PRP, LLC, Louisville, CO (US)

(72) Inventors: Aaron Wedeking, Temecula, CA (US); Nathan J. Coleman, Murrieta, CA (US)

(73) Assignee: Bestop PRP, LLC, Louisville, CO (US)

( * ) Notice: Subject to any disclaimer, the term of this patent is extended or adjusted under 35 U.S.C. 154(b) by 0 days.

(21) Appl. No.: 16/196,370

(22) Filed: Nov. 20, 2018

(65) Prior Publication Data

US 2019/0085958 A1 Mar. 21, 2019

Related U.S. Application Data

(63) Continuation of application No. 15/371,838, filed on Dec. 7, 2016, now Pat. No. 10,160,419.

(51) Int. Cl.
| | | |
|---|---|---|
| *F16H 31/00* | (2006.01) | |
| *B60P 7/08* | (2006.01) | |
| *B60R 22/30* | (2006.01) | |
| *F16H 21/44* | (2006.01) | |
| *B60R 22/34* | (2006.01) | |

(52) U.S. Cl.
CPC ............ *F16H 31/002* (2013.01); *B60P 7/083* (2013.01); *B60R 22/30* (2013.01); *B60R 22/3408* (2013.01)

(58) Field of Classification Search
CPC ..... F16H 31/002; F16H 21/44; A44B 11/125; B60P 7/083; B60R 22/3408; B60R 22/30; Y10T 24/2175; Y10T 24/4072
See application file for complete search history.

(56) References Cited

U.S. PATENT DOCUMENTS

| | | | | |
|---|---|---|---|---|
| 2,873,090 A | * | 2/1959 | Hale | ................. B60P 7/0838 254/250 |
| 4,118,833 A | | 10/1978 | Knox et al. | |
| 4,154,427 A | * | 5/1979 | Hofmann | ................. B60P 7/083 24/68 CD |
| 4,395,796 A | * | 8/1983 | Akaura | ................. A44B 11/125 24/265 CD |
| 5,173,996 A | * | 12/1992 | Chou | ................. A44B 11/12 24/68 CD |
| 5,271,606 A | * | 12/1993 | Kamper | ................. B60P 7/083 254/217 |
| 5,542,798 A | | 8/1996 | Rawdon et al. | |

(Continued)

*Primary Examiner* — Robert Sandy
*Assistant Examiner* — Rowland Do
(74) *Attorney, Agent, or Firm* — Warn Partners, P.C.

(57) ABSTRACT

A ratcheting belt system with opposed rollers and quick release capability provides two opposed rollers which frictionally allow a tightening belt of a safety harness, cargo securement system, between themselves compressively, via a manually operated ratcheting handle such that the excess length of belt distal to the active portion used for securement is passed through the system substantially parallel to the active portion of belt, and need not be contained on a spool. A ratchet mechanism prevents back-out of the belt through the buckle, a manually operated lever provides for opening of the rollers away from each other and easy, quick exit of the driver, passenger, or cargo from securement.

1 Claim, 9 Drawing Sheets

(56) References Cited

U.S. PATENT DOCUMENTS

| | | | |
|---|---|---|---|
| 5,839,170 A | 11/1998 | Cho | |
| 5,904,341 A * | 5/1999 | Norrby | B60P 7/083 254/214 |
| 6,499,197 B1 * | 12/2002 | Huang | A44B 11/125 24/171 |
| 6,708,953 B1 * | 3/2004 | Chang | B60P 7/083 254/218 |
| 6,802,470 B2 | 10/2004 | Smithson et al. | |
| 7,004,695 B1 * | 2/2006 | Wen-Hsiang | A44B 11/125 410/100 |
| 7,020,933 B2 * | 4/2006 | Chang | A44B 11/125 24/68 CD |
| 7,083,135 B2 | 8/2006 | Fleischmann et al. | |
| 7,232,089 B2 | 6/2007 | Inagawa et al. | |
| 7,263,750 B2 | 9/2007 | Keene et al. | |
| 7,444,718 B1 | 11/2008 | Chang | |
| 7,559,729 B2 | 7/2009 | Ruan | |
| 8,099,836 B2 * | 1/2012 | Breeden | B60P 7/083 24/68 CD |
| 8,291,552 B2 | 10/2012 | Gopal et al. | |
| 8,528,849 B2 * | 9/2013 | Chang | B60P 7/083 24/68 CD |
| 9,277,776 B2 | 3/2016 | Laatz | |
| 2007/0193001 A1 * | 8/2007 | Huang | A44B 11/065 24/71 ST |

* cited by examiner

BELT RATCHETING SYSTEM WITH DUAL ROLLERS AND ADJUSTABLE RELEASE BUCKLE

CROSS-REFERENCE TO RELATED APPLICATIONS

This application is a continuation of U.S. patent application Ser. No. 15/371,838, filed Dec. 7, 2016. The disclosure of the above application is incorporated herein by reference.

BACKGROUND OF THE INVENTION

1. Field of the Invention

The invention generally relates to belts used to secure objects or persons.

2. Description of Related Art

Various fastening belt devices are known in the related art. Some non-exhaustive examples include the following:

Belt securing devices with grip handles to tighten a belt or strap are known in the related art. For example, U.S. Pat. No. 8,291,552 to Gopal et al, U.S. Pat. No. 7,444,718 to Chang, U.S. Pat. No. 5,542,798 to Rawdon et al, and U.S. Pat. No. 4,118,833 to Knox et al.

Further, belt securing devices which roll unused portions of a belt or strap onto a spool are known. For example: U.S. Pat. No. 7,559,729 to Ruan, U.S. Pat. No. 7,444,718 to Chang, U.S. Pat. No. 7,232,089 to Inagawa et al, U.S. Pat. No. 7,083,135 to Fleischmann et al, U.S. Pat. No. 6,802,470 to Smithson et al, U.S. Pat. No. 5,542,798 and to Rawdon et al. However, such devices lack a "lay flat" or parallel exit of the unused portion of the belt.

Also known are devices with a lay-flat portion of the belt upon exiting the buckle. These include, for example: U.S. Pat. No. 9,277,776 to Laatz, U.S. Pat. No. 8,291,522 to Gopal et al, U.S. Pat. No. 7,263,750 to Keene et al, U.S. Pat. No. 5,839,170 to Cho, and U.S. Pat. No. 4,118,833 to Knox. However, such devices lack a ratcheting system to maintain the belt.

Furthermore, devices which provide a ratchet system to maintain the tension of the belt are known. For example, such devices include: U.S. Pat. No. 9,277,776 to Laatz, U.S. Pat. No. 7,559,729 to Ruan, U.S. Pat. No 7,444,718 to Chang, U.S. Pat. No. 7,232,089 to Inagawa et al, U.S. Pat. No. 7,083,135 to Fleischmann et al, U.S. Pat. No. 6,802,470 to Smithson et al, U.S. Pat. No. 5,839,170 to Cho, and U.S. Pat. No. 5,542,798 to Rawdon et al. However, such devices lack quick loosening, tightening and exit without a separate portion which clips into the buckle.

In addition, some known devices provide for a quick loosening, tightening, and exit without a separate part that clips into the buckle. These include U.S. Pat. No. 9,277,776 to Laatz and U.S. Pat. No. 4,118,833 to Knox.

Conventional motor vehicles are typically equipped with a fabric restraint system, including a wide range of tie-down systems. Some tie-down systems with ratcheting tightening and handles for mechanical advantage are known. An example is U.S. Pat. No. 7,444,718 to Chang. Current art typically rolls the unused portion of the belt on a spool though there are early examples and the example of modern aircraft seatbelts where the ante-buckle length belt does lay flat though it is retained by a cinch with no mechanical assist for tightening. Typical consumer versions in passenger cars have an automatic roller which generally engages during a crash or sudden stoppage event, having tension at all times being considered a burden on the operator. U.S. Pat. No. 7,232,089 to Inagawa teaches a typical example of a spooled vehicle belt take-up system. Other examples can be seen in U.S. Pat. No. 7,083,135 to Fleischmann and U.S. Pat. No. 6,802,470 to Smithson. Such conventional spool-based systems facilitate quick release of the belt material due to aspects of the spool allowing belt length to unroll off the spool when not in a crash situation. However, such conventional spool-based systems have no mechanical tightening assist of any sort nor maintenance of tension.

Typically, high-performance racing vehicles have seat belt systems require use of a tool or wrench to tighten the seat belt. For example, in U.S. Pat. No. 7,559,729 to Ruan, a ratcheting spool device is disclosed for use in a cargo tie down which requires use of a separate tightening tool; a spool is required; and no quick release of the belt is provided. In such conventional seat belt systems, it is then necessary in a passenger restraint application to move the conventional spool away from the operator and mount such conventional spool out of the way in a different location, such as on the floor of the vehicle. Some vehicle restraint systems and other securements allow for a buckle by allowing feed-through of the belt material through such buckle, with the belt material exiting parallel to the incoming tensioned material. For example, U.S. Pat. No. 9,277,776 to Laatz teaches a ratcheting buckle for securement of a clothing item. Also For example, U.S. Pat. No. 4,118,833 to Knox and U.S. Pat. No. 8,291,552 to Gopal each teach lay-flat spool-free designs, but do not teach convenient continuous feed-thru tightening. Laatz does not require a spool but does requires a notched strip built into the belt and has no force multiplication device to increase tightening forces. Similarly, U.S. Pat. No. 5,839,170 to Cho teaches a buckle which teaches a rotating ratchet to enforce non-slippage of the belt and a spool-free design, again with the requirement of a special surface in the belt to match the ratchet and no mechanism to apply significant tightening force. Particularly for passenger restraint use, such conventional devices typically have a one-hand operable release mechanism where the mating insert of the device attached to the opposing length of belt, if not the belt itself, is released. These are typically seen in conventionally mandated passenger seatbelts such as those taught by Keene in U.S. Pat. No. 7,263,750. This does not provide for convenient adjusting of belt tension of a heavy or debris covered belt as is encountered in off-road racing or securement of cargo in primitive or dirty environments.

Designs featuring grip handles to apply strong tightening forces are known. Such conventional handles typically place the inactive length of belt on a spool. An example is seen in U.S. Pat. No. 7,444,718 to Chang. Another is seen in U.S. Pat. No. 5,542,798 to Rawdon et al, teaching the tightening handle (76) and the spool, or " . . . fluted spindle (98) onto which the belt is wound . . . " without any lay flat capability for the non-active part of the belt.

It can be seen from the related art that there is a need for a securement system combining several features, including: mechanical assist in tightening, continuous feed capability, quick release of the belt, and spool-free operation. It can be seen that there is also a need for a seat belt securement device which provides a mechanical tightening assist with a spool free design that can accommodate any length of belt, a quick release mechanism of the belt itself, the ability to continuously feed any length of belt or strap through the buckle with mechanical assist and the ability to use plan belt material without any special features or surfaces to interact with the ratchet.

BRIEF SUMMARY OF THE INVENTION

A ratcheting securement system is disclosed with an opposing roller tightening mechanism configured such that an active belt end (that is to say the end of a belt, whether the opposite end of said belt is secured to a structure such as in use as a vehicle passenger restraint, or to the opposite side of the ratcheting buckle typically configured to secure a load) can be taken up via a ratcheting handle to tighten the system to secure a load or restrain a vehicle passenger, the active belt end (this is defined as any part of the belt available to be drawn into the buckle by the action of the roller, this can be nearly the entire length when configured as a continuous loop) being rolled between said opposing rollers which are mechanically configured to rotate only in the direction of tightening the active belt. The active belt, under tension increases the forces of the opposed rollers acting against each other due to an eccentric causing a first or "top" roller to tend toward the direction of force, and thus compressing the active belt between them strongly preventing slippage of the active belt. The two opposed rollers allow for frictional tightening of the belt either in normal use or in tightening as this condition squeezes the active belt between them. The active belt may be loosened by raising a second handle, that is a "release" handle such that said opposed rollers are separated from each other and at this point, the friction of the belt earlier squeezed between the two rollers is lost and the rollers no longer grip the active belt. Also at this point the active belt may be adjusted in either direction, into (to further tighten) or out of (to loosen) the active end of the ratcheting buckle mechanism. The system also includes a passive end of the buckle which does not vary the length of belt, but would be secured to an end of the length of a belt, or the other end of the length of active belt if configured in a loop, or an object such as a structure or vehicle. This may comprise the opposite length of the belt forming a passive end secured to the passive end of the ratcheting buckle, forming an adjustable loop, or the passive belt end may be a second length of belt secured to a structure or vehicle, or the passive end of the buckle may itself be secured to a structure or vehicle. It is an object of the invention that the ante-buckle length of belt is free immediately upon its emergence from the second, or "bottom" roller; it is not wound on a spool as practiced in the current state of the art. There is no requirement to accommodate the mechanism of a spool, and the ante-buckle portion of the active belt. The ante-portion can be the portion of the belt passed through the buckle and not be in tension. The ante-buckle portion can lay flat against the ex-ante part of the active belt. The ante portion can be under tension when in use. The ex- ante portion can be in tension when in use, but has not been drawn into the buckle. Very long belts may be used as it is not necessary to retain the ante-buckle portion on a spool or reel.

In a preferred embodiment, the present invention can facilitate securing a passenger in a vehicle or as a cargo strap to secure a load in place.

DETAILED DESCRIPTION OF THE PREFERRED EMBODIMENTS

In the following description, for purposes of teaching the art and not limitation, description and details are set forth of the present invention such that those skilled in the art may have a thorough understanding. It will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments. In addition, embodiments of the inventions can comprise several novel features and no single feature need be solely responsible for its desirable attributes or is essential to practicing the inventions herein described.

Figure 1:
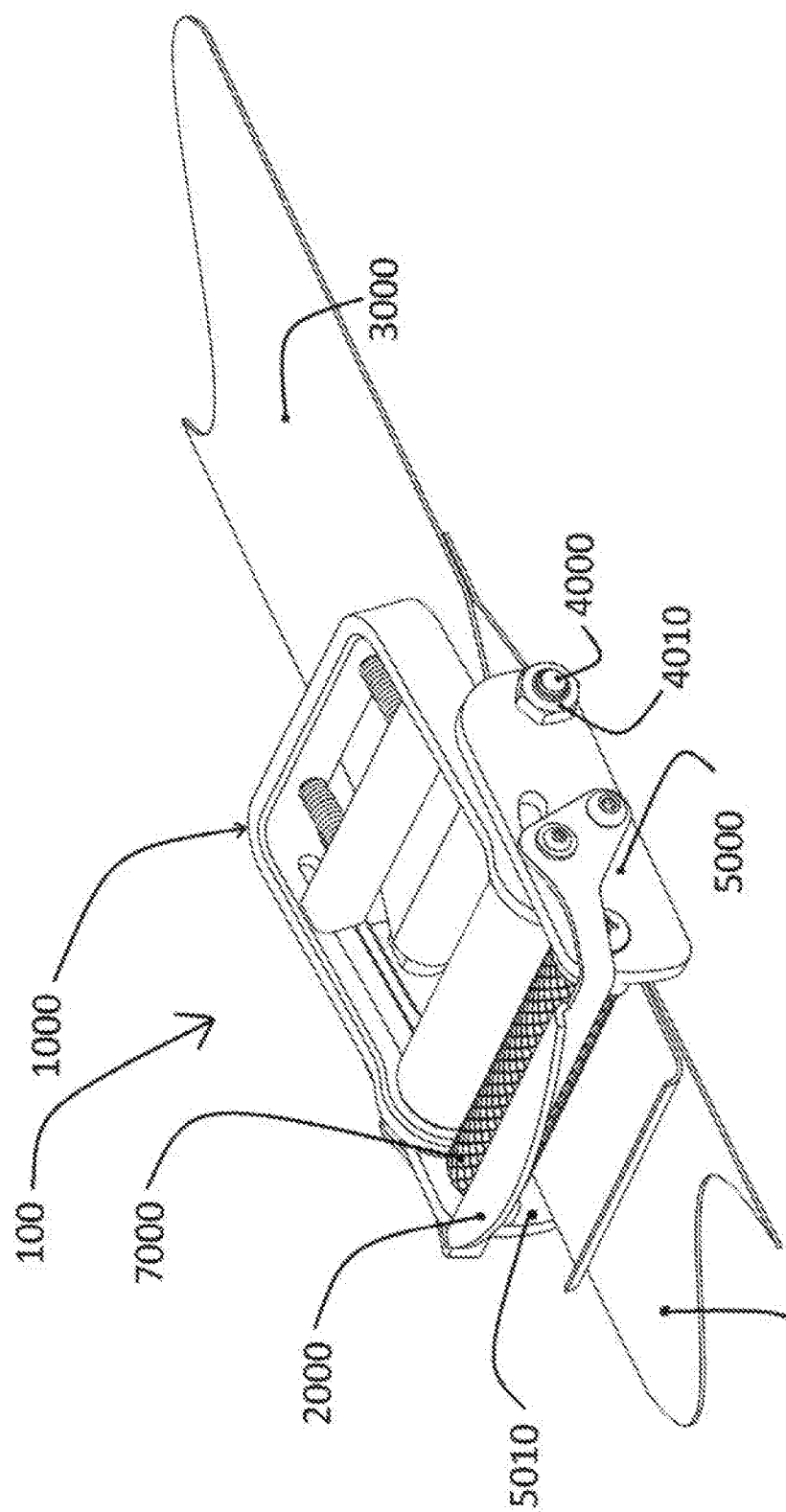
FIG. 1 shows an overall view of an embodiment of the present invention.

FIG. 1 depicts an embodiment of ratcheting harness buckle 100. Ratchet grip 1000 and release handle 2000 can be substantially flat against buckle 100. Passive belt 3000 can be secured in buckle 100 by pin 4000 to facilitate securement of passive belt 3000, which can be secured in buckle 100, and can hold first and second side plates 5000 and 5010 via nut or attachment system 4010. Active belt 3010 comes into buckle 100 from the end associated with release handle 2000, loops over top roller 6000 (FIG. 6) under bottom roller 7000, and out of buckle 100. By way of non-limiting illustration, see FIG. 4. In an embodiment has a first active length of active belt 3010 entering belt mechanism 100, looping around a first roller and under a second roller, and out of the active end of the ratcheting buckle 100.

Ratcheting harness buckle 100 can be an assembly configured to tighten o hold a belt or strap, provide for its tightening and release of belt or strap as the operator desires via using two contra-rotating cylinders, at least one of which contains a ratchet, and without need of a spool to wrap the belt or strap. Ratcheting harness buckle 100 can be made of common metallic, polymer, or other materials or combinations of materials and by using common methods such as machining, casting, injection molding, 3D Printing, or combinations of these and/or other methods. The components may be held in place with common fasteners such as clips and screws as well as press fits, welding, and adhesives. The ratcheting harness buckle 100 draws in the belt or strap a first active end 3010 as the operator cranks on a handle, expelling the ante buckle part of the belt parallel to the ex-ante part and provides for gripping the belt with increasing force as tension is applied to the belt. The ratcheting harness buckle 100 provides for a means to release pressure of the contra-rotating rollers on the belt rollers thus allowing the belt to be loosened by the operator by lifting a second handle. The second end of the ratcheting harness buckle 100 can be affixed to a second belt or strap, or affixed to a structure, or affixed to the other end of the belt or strap being drawn into the first end of the ratcheting harness buckle 100. Inn an embodiment, ratcheting harness buckle 100 can be a component or assembly of components made by any or all of several methods including machining, molding, 3D printing, or other methods and can be constructed of metal, polymer, composite, or other solid materials. Ratcheting harness buckle 100 can have one or more substantially parallel side plates, if more than one such buckle 100, configured to contain other components. Ratcheting harness buckle 100 can include two or more contra rotating ratcheting rollers. Ratcheting harness buckle 100 can affix one end of a belt, or can affix one end of the assembly to a structure. Ratcheting harness buckle 100 can include a handle configured to tighten the belt. The handle can include a release to de-couple it from tightening the belt. Ratcheting harness buckle 100 can include a handle to separate the rollers for easier adjustment of the system or to quickly release tension on the belt. Ratcheting harness buckle 100 can function as a means to secure two ends of belt into a loop or hold one end of a belt to a structure. Ratcheting harness buckle 100 can be configured to tighten the belt, strongly hold the belt in place, or release the belt as desired by the operator.

Figure 5:
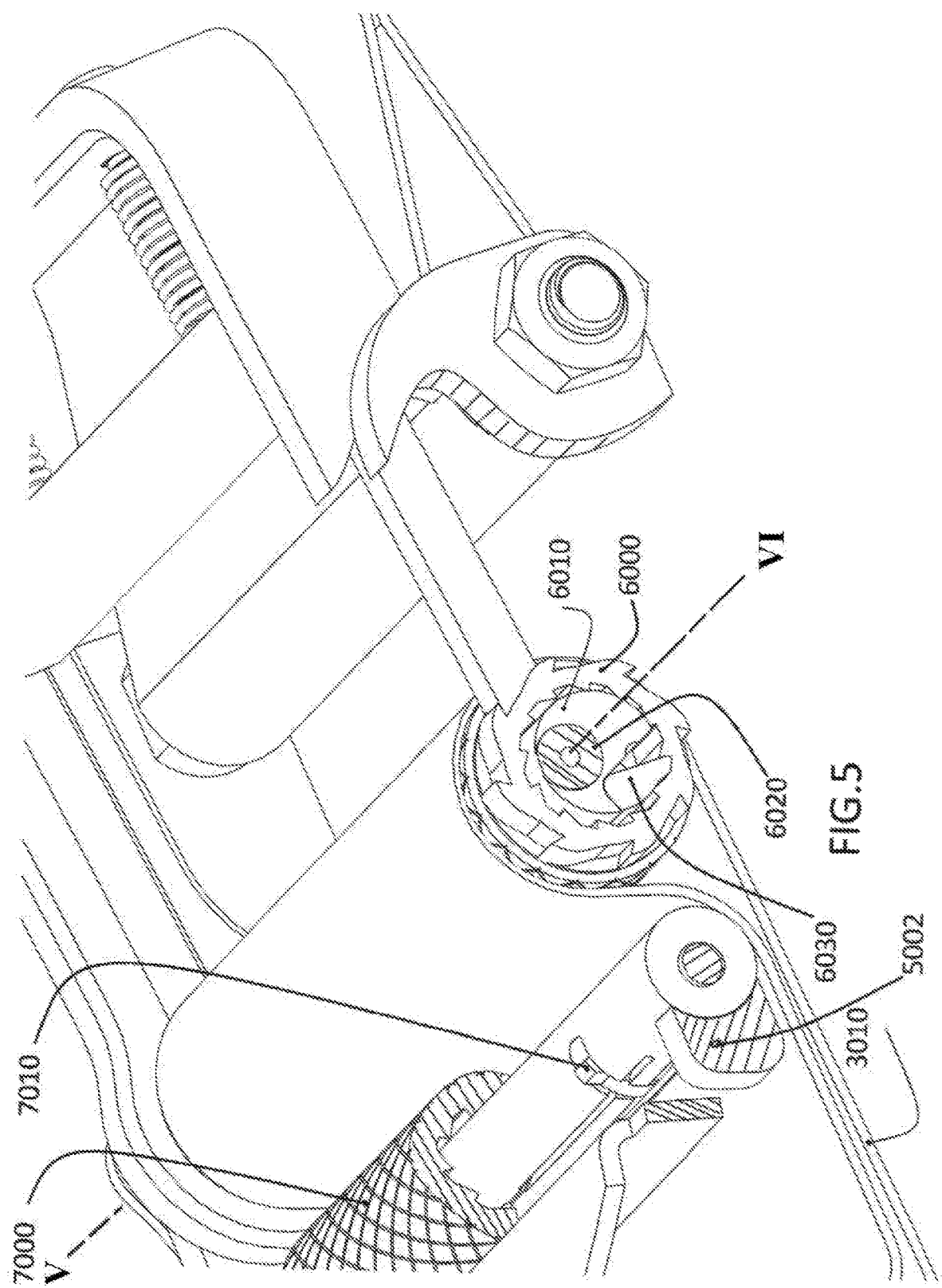
FIG. 5 is a close-up view of an embodiment of the present invention.
Figure 6:
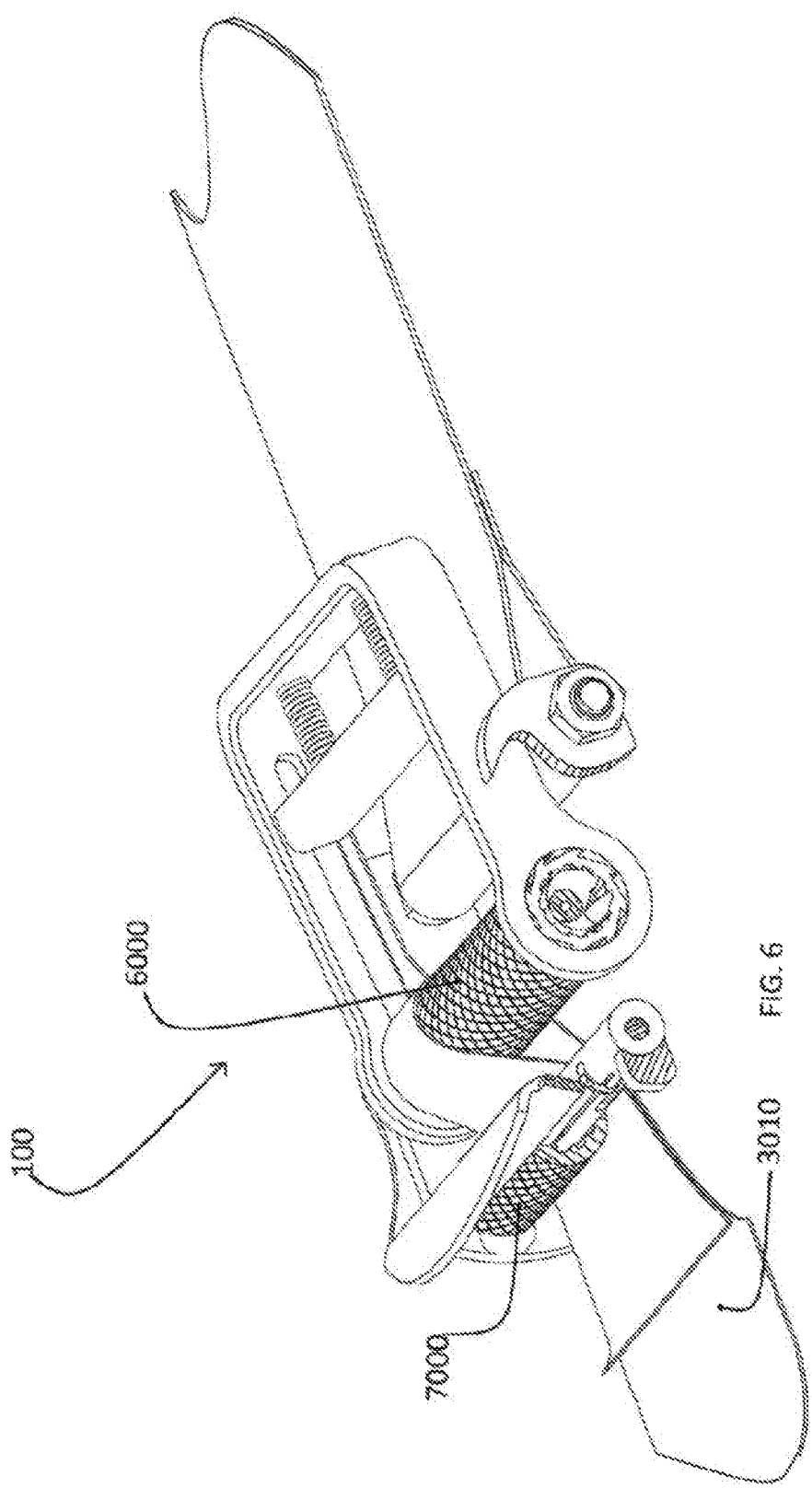
FIG. 6 is a cutaway view of an embodiment present invention with a ratcheting mechanism in the release mode to show loosening operation.

Ratchet grip 1000 can be a component configured to be grasped by the operator as the operator desires. It can be configured to rotate on an axis XI-XII consistent with the axis of ratcheting roller 6000 (FIGS. 5 and 6). Ratchet grip 1000 can be configured such that operating the handle in one direction tightens an active belt or strap 3010, and the other direction does not affect the condition of the active belt or strap 3010. Ratchet grip 1000 can be made of common metallic, polymer, or other materials or combinations of materials and by using common methods such as machining, casting, injection molding, 3D Printing, or combinations of these and/or other methods. Ratchet grip 1000 may be held in place with common fasteners such as clips and screws as well as press fits, welding, and adhesives. Ratchet grip 1000 can facilitate tightening of an active belt or strap 3010 as desired by the operator and can be returned to its initial position where ratchet grip 1000 does not interfere with the use of ratcheting harness buckle 100. Ratchet grip 1000 can incorporate manual pawl 1040 configured to force ratcheting roller 6000 to rotate with operation of ratchet grip 1000 in one direction of rotation. Manual pawl 1040 may incorporate one or more springs 1050 (FIG. 8) to maintain engagement with ratcheting roller 6000 and a feature to allow the operator to disengage the manual pawl 1040 as desired.

Release handle 2000 can be a component configured to be grasped by the operator as the operator desires. Release handle 2000 can be configured to be movable via I-II, or release handle 2000 can rotate on an axis with side plates 5000 and 5010 of ratcheting harness buckle 100. Release handle 2000 can be made of common metallic, polymer, or other materials or combinations of materials and by using common methods such as machining, casting, injection molding, 3D Printing, or combinations of these and/or other methods. Release handle 2000 may be held in place with common fasteners such as clips and screws as well as press fits, welding, and adhesives. Release handle 2000 can be positioned and configured to allow access to and operation of by the operator as desired. Operation of the release handle 2000 can cause contra rotating rollers 6000 and 7000 to separate from each other thus removing grip or pressure on the active belt 3010, allowing active belt 3010 to be loosened.

Passive belt 3000 can be a length of belt or strap affixed to one end of ratcheting harness buckle 1000. Passive belt 3000 can be affixed to ratcheting harness buckle 1000 by one or more of several means, by non-limiting example, a bolt through a loop formed in Passive Belt 3000 or be attached to ratcheting harness buckle 1000 via fasteners or other means such as by non-limiting example welding, clamping, locking features, and/or adhesives. The end of passive belt 3000 not attached to ratcheting harness buckle 100 can be affixed to a structure or vehicle by any means including as described for the end affixed to Ratcheting harness 100 or may be continuous with or affixed to active belt 3010. It can be constructed of fabric, fibrous, metal, polymer, or other materials capable of withstanding tensile forces. Passive belt 3000 can be constructed by means such as by non-limiting example weaving, knitting, extrusion, molding, 3D Printing, or other means. Passive belt 3000 can be commonly and currently used seat belt or commercial strap material of any type and made by any means and can be constructed as a flat chain made of interlocking or attached components. Passive belt 3000 has the function of affixing ratcheting harness buckle 1000 to a structure, vehicle, or to active belt 3010.

Pin 4000 can be a bolt, screw, rod, or other component. Pin 4000 can be affixed or attached to ratcheting harness buckle 1000 by one or more of any means including by non-limiting example including welding, fasteners, pins, adhesives or features such as threads, grooves, or press fits. Pin 4000 can be made of common metallic, polymer, or other materials or combinations of materials and by using common methods such as machining, casting, injection molding, 3D Printing, or combinations of these and/or other methods. Pin 4000 can be assembled to ratcheting harness buckle 100 via direct insertion manually of by machine, or it can be cast, molded, or printed in place. Pin 4000 can facilitate holding any of side plates 5000, 5010 in place and/or can provide an attachment point for passive belt 3000.

Attachment system 4010, in a possible embodiment, can be a threaded fastener such as a nut, pins, clips, press fit, or any other type of attachment system. Attachment system 4010 can be made of common metallic, polymer, or other materials or combinations of materials and by using common methods such as machining, blanking, broaching, casting, injection molding, 3D printing, or any combinations of these and/or other methods. Attachment system 4010 can be held in place, by way of non-limiting illustration, via common fasteners such as clips and screws as well as press fits, welding, and/or adhesives. In embodiments where attachment system 4010 is a nut, attachment system 4010 can facilitate securing bolt 4000 in place in the assembly. Attachment system 4010 may also facilitate securing side plates 5000 and 5010 in the assembly.

Side plate 5000 or first side plate 5000 can be a substantially flat plate holding several parts or subassemblies of the ratcheting harness buckle 100 in place. Side plate 5000 can have several threaded or unthreaded holes and an arc-shaped radial receiver groove 5005. Side plate 5000 can be made of common metallic, polymer, or other materials or combinations of materials and by using common methods such as machining, blanking, broaching, casting, injection molding, 3D printing, or any combination of these and/or other methods. The component may be held in place with common fasteners such as clips and screws as well as press fits, welding, and adhesives. First side plate 5000 can, in combination with second side plate 5010, facilitate locating the assemblies of opposed rollers such as top roller 6000, bottom roller 7000, bolt 4000 and release handle 2000, and can keep components in place.

Second side plate 5010 can be can be a substantially flat plate holding several parts or subassemblies of ratcheting harness buckle 100 in place. Second side plate 5010 can have several threaded or unthreaded holes and an arc-shaped radial receiver groove 5005. Second side plate 5010 can be made of common metallic, polymer, or other materials or combinations of materials and by using common methods such as machining, blanking, broaching, casting, injection molding, 3D Printing, or combinations of these and/or other methods. The component may be held in place with common fasteners such as clips and screws as well as press fits, welding, and adhesives.

First and second side plates 5000, 5010 can locate the assemblies of opposed rollers that can include top roller 6000, bottom roller 7000, bolt 4000 and release handle 2000 in place.

Top roller 6000 a substantially cylindrical shaped component with a ratcheting feature on the inner surface and a friction enhancing feature on the outer surface. Top roller 6000 can be made of common metallic, polymer, or other materials or combinations of materials and by using common methods such as machining, blanking, broaching, casting, injection molding, 3D printing, or combinations of these and/or other methods. Top roller 6000 can be held in place with common fasteners such as clips and screws as well as press fits, welding, and adhesives. Top roller 6000 can be restrained from turning in a direction that would loosen the belt via the action of a ratchet pawl 6030 and may be constrained to an axis XI-XII. Top roller 6000 may be configured to increase gripping force on active belt 3010. By way of non-limiting illustration, gripping force can be increased on active belt 3010 via eccentric 6010 shown in FIG. 2.

Figure 4:
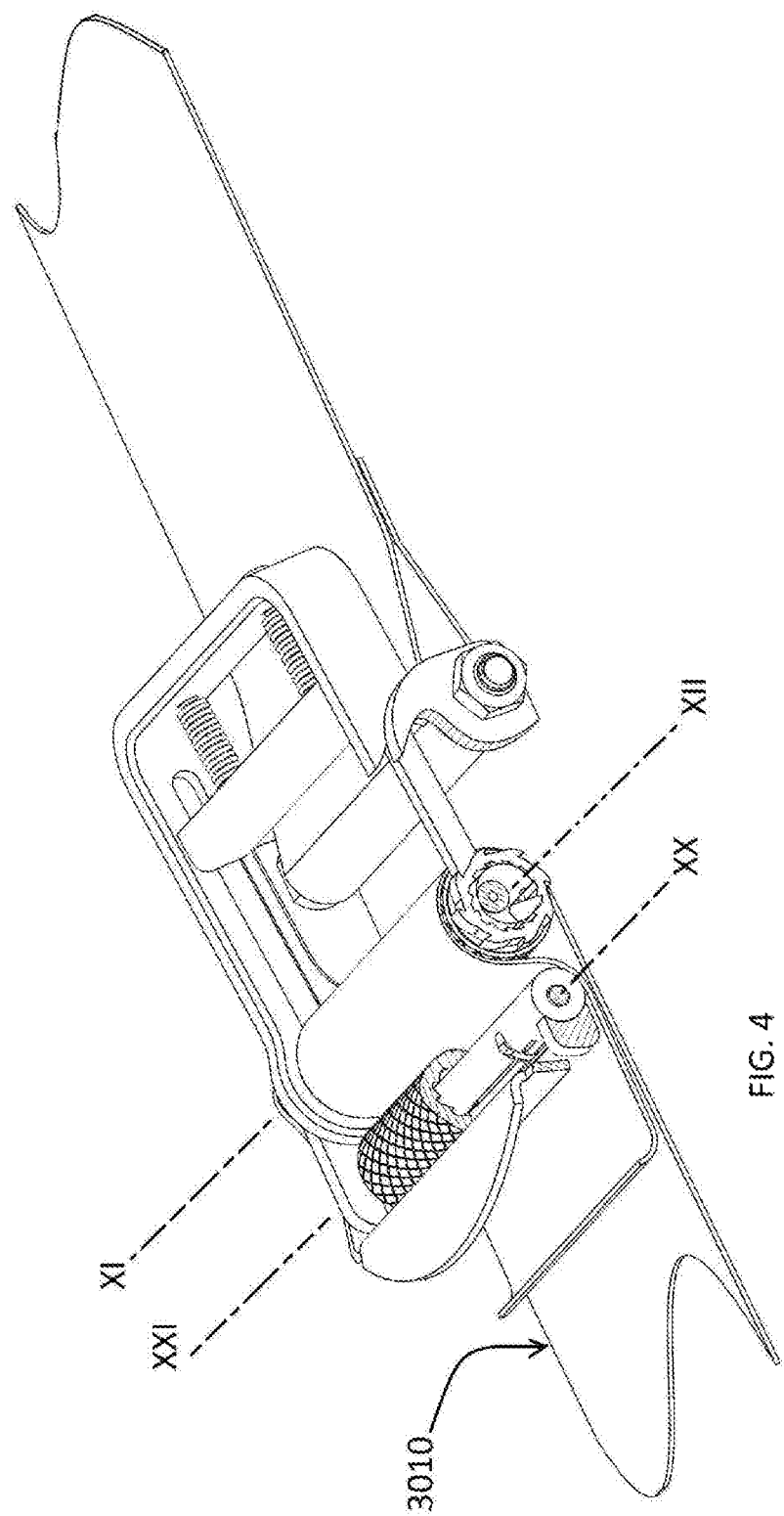
FIG. 4 is a cutaway view of an embodiment of the present invention showing a ratcheting and tightening mechanism after tightening and in use.

Bottom roller 7000 can be a substantially cylindrical shaped component with a ratcheting feature on the inner surface and a friction enhancing feature on the outer surface. Bottom roller 7000 can be made of common metallic, polymer, or other materials or combinations of materials and by using common methods such as machining, blanking, broaching, casting, injection molding, 3D printing, or combinations of these and/or other methods. Bottom roller 7000 can be held in place with common fasteners such as clips and screws as well as press fits, welding, and adhesives. Bottom roller 7000 can be restrained from turning in a direction that would loosen the belt via the action of bottom ratchet pawl 7010. Bottom roller 7000 may be configured to be constrained in translation via axis XX-XXI (FIG. 4).

Figure 2:
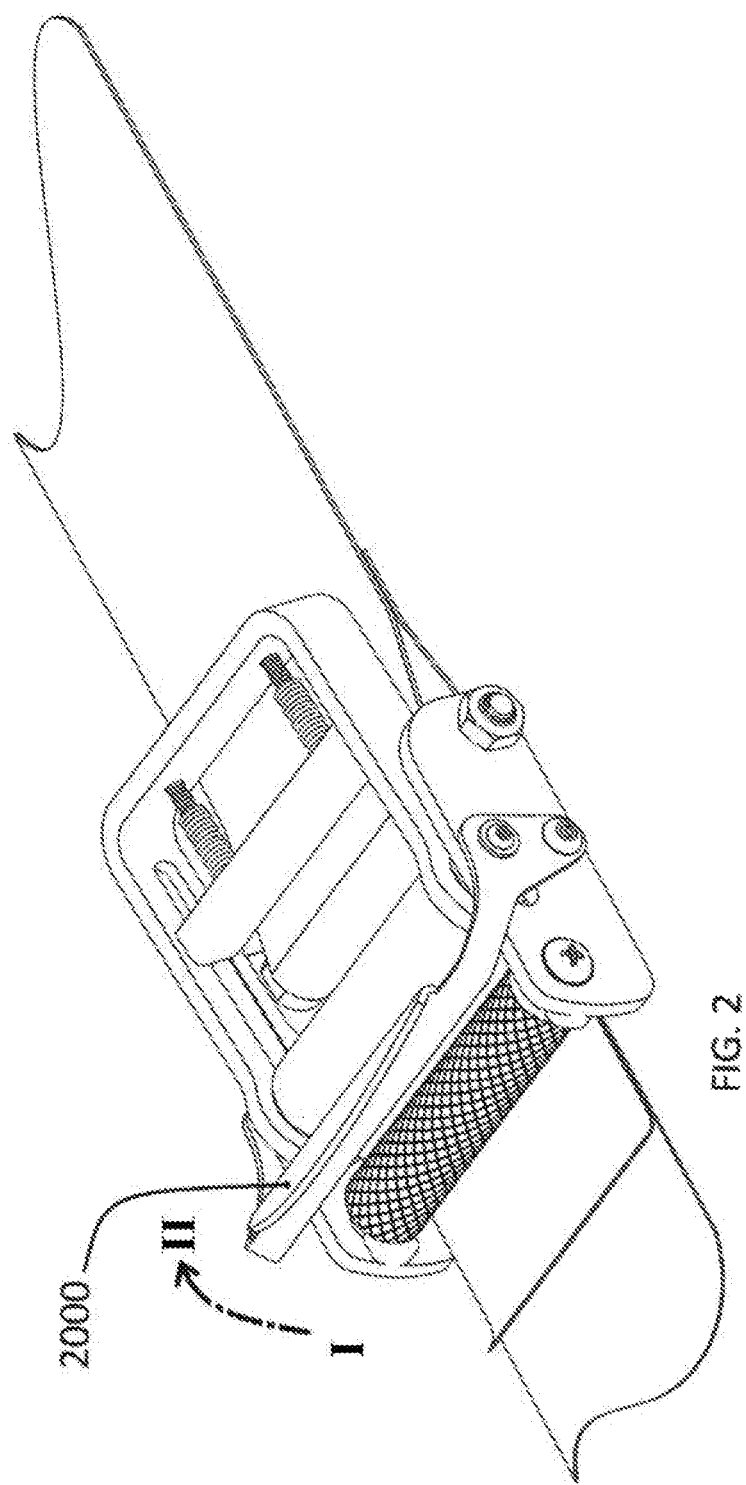
FIG. 2 shows an embodiment of the present invention wherein buckle 100 is being loosened and release handle 2000 is raised.
Figure 9:
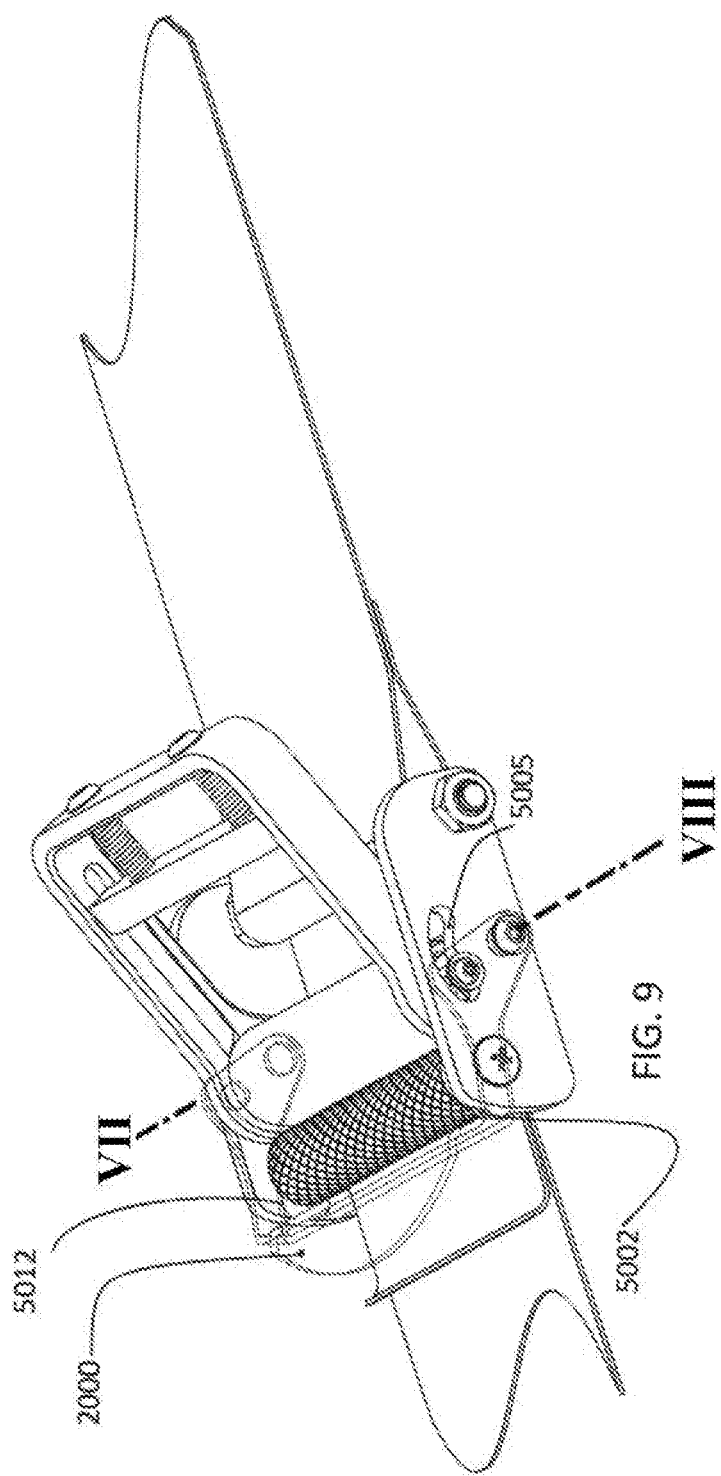
FIG. 9 shows the release handle in wireframe view so that the rotation about an axis VII-VIII and detail of cutout 5005 may be illustrated.

FIG. 2 shows the buckle being loosened. Release handle 2000 can be raised or lowered. FIG. 2 shows the system with the buckle being loosened. Release handle 2000 can be rotatably lifted from the retracted position shown in FIG. 1, in the direction of the arrow and that this action separates the rollers which can also be understood by way of non-limiting illustration in FIG. 6. This mechanical movement can also be understood by way of non-limiting illustration in FIG. 9, showing a possible embodiment wherein release handle 2000 can be configured to rotate about axis VII-VIII. Release handle 2000 can be connected via a fastener to the stub of eccentric 6010, which can rotate about axis VII-VIII. By way of non-limiting illustration, see FIGS. 5 and 9. Side plates 5000 and 5010 can be configured with a radial receiver groove 5005 concentric with axis VI-VIII (FIG. 9).

It would be known to one of ordinary skill in the art that lifting release handle 2000 from its retracted position can thereby separate opposed rollers: top roller 6000 and bottom roller 7000, creating an opportunity to pull active belt 3010 out of belt mechanism 100.

Radial receiver groove 5005 can be on or in first side plate 5000 and/or second side plate 5010. Radial receiver groove 5005 can be placed into first side plate 5000 and/or second side plate 5010 by way of non-limiting illustration, via: machining, milling, casting, electron discharge machining, blanking, stamping, and molding. Radial receiver groove 5005 serves the function of allowing and guiding the motion of stub 6020 with increasing tension on an active belt 3010 or via lifting a release handle 2000.

Eccentric 6010 (FIG. 5) can be a substantially cylindrical component housed within top roller 6000. Eccentric 6010 can have stub 6030 on an axis V-VI which can be substantially parallel to but different from its own axis XI-XII. Eccentric 6010 can be configured to contain a ratchet pawl. It can be made of common metallic, polymer, or other materials or combinations of materials and by using common methods such as machining, blanking, broaching, casting, injection molding, 3D Printing, or combinations of these and/or other methods. The component may be held in place with common fasteners such as clips and screws as well as press fits, welding, and adhesives.

Active belt 3010 can be a length of belt or strap looped around an upper ratcheting roller 6000 and lower ratcheting roller 7000 at the active end of ratcheting harness buckle 1000. Active belt 3010 can be affixed to ratcheting harness buckle 1000 at the other end by one or more of several means, by non-limiting example, a bolt through a loop formed in active belt 3010 or be attached to ratcheting harness buckle 1000 via fasteners or other means such as by non-limiting example welding, clamping, locking features, and/or adhesives. The end of active belt 3010 not feeding into the active ratcheting harness 100 can be affixed to a structure or vehicle by any means including as described for the end affixed to Ratcheting Harness 100 or may be continuous with or affixed to Passive Belt 3000. Active belt 3010 can be constructed of fabric, fibrous, metal, polymer, or other materials capable of withstanding tensile forces. Active belt 3010 can be constructed by means such as by non-limiting example weaving, knitting, extrusion, molding, 3D printing, or other means. Active belt 3010 can be commonly and currently used seat belt or commercial strap material of any type and made by any means and can be constructed as a flat chain made of interlocking or attached components. Active belt 3010 can enter the active end of ratcheting harness buckle 100, looping around upper ratcheting roller 6000 and under ratcheting roller 7000, forming part or all of the tightening circuit to secure the object or person intended to be secured.

Figure 3:
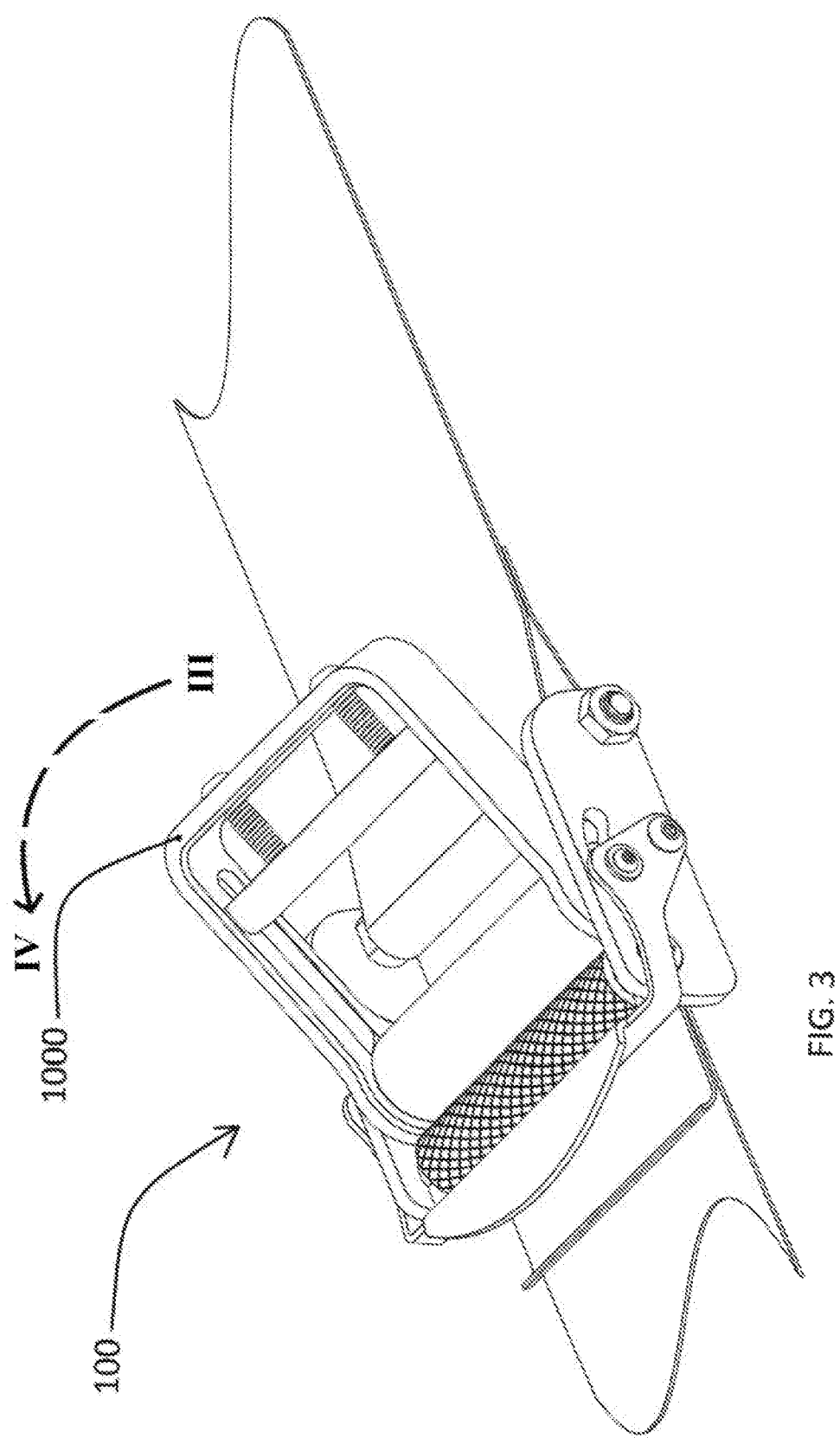
FIG. 3 shows an embodiment of the present invention wherein buckle 100 is being tightened and ratchet grip 1000 is raised.

FIG. 3 shows buckle 100 being tightened. Note the ratchet grip 1000 is raised. FIG. 3 shows the system being tightened. Ratchet grip 1000 can be rotatably raised in the direction indicated by Roman numerals Raising ratchet grip 1000 can pulls in some ex-ante length (that is the length of the belt not yet drawn into buckle 100) of active belt 3010, and pushes ante-buckle length of inactive belt 3011 out of the buckle 100. Opposed rollers (top 6000 and bottom roller 7000) can be forced against each other in this condition, increasing their forces on the belt in between them and thus the friction forces between rollers 6000 and 7000 together and active belt 3010, thus allowing frictional tightening of the belt. FIG. 6 shows a possible embodiment in which ratchet grip 1000 can rotate about the axis of top roller 6000. Note that separation of rollers 6000 and 7000 in the condition shown can substantially decrease the friction of the roller surfaces on the belt, allowing said rollers 6000 and 7000 to be loosened.

Inactive belt 3011 can be a length of belt ex-ante the contra-rotating opposed Upper (6000) and lower (7000) rollers. Inactive belt 3011 can be free of tension. Inactive belt 3011 can be contained, rolled, not contained, or not rolled. Inactive belt 3011 can be constructed of fabric, fibrous, metal, polymer, or other materials capable of withstanding tensile forces. Inactive belt 3011 can be constructed by means such as by non-limiting example weaving, knitting, extrusion, molding, 3D Printing, or other means. Inactive belt 3010 can be commonly and currently used seat belt or commercial strap material of any type and made by any means and can be constructed as a flat chain made of interlocking or attached components. There would not be tension from the securement in this length of belt ex-ante to the opposed contra-rotating rollers. This is the length of belt or strap fed through the rollers and out of Ratcheting harness buckle 100.

FIG. 4 is a cutaway view showing the ratcheting and tightening mechanism as it would be after tightening and in use.

FIG. 5 is a close-up view as it would be after tightening and in use showing detail of the pawl mechanisms. In an embodiment, two rollers can be pressed tighter against each other by any pulling on active belt 3010 due to eccentric 6010 which can be configured to rotate about an axis indicated by Roman numerals V-VI via its respective stub 6020, thus increasing grip on active belt 3010. Top roller pawl 6030 can prevent top roller 6000 from rotating in the clockwise direction relative to the reader. Bottom roller 7000 can thus be prevented from rotating in the counterclockwise direction relative to the reader by bottom roller pawl 7010. Note that once tightened and placed in the ready for use condition, tension on active belt 3010 increases the force of top roller 6000 against bottom roller 7000 with active belt 3010 between them and thus friction forces on belt 3010 preventing slippage.

Stub 6020 can be an integral or added on part of eccentric 6010. Stub 6020 can be made of common metallic, polymer, or other materials or combinations of materials and by using common methods such as machining, casting, injection molding, 3D Printing, or combinations of these and/or other methods. The component may be held in place with common fasteners such as clips and screws as well as press fits, welding, and adhesives as well as being produced integral with eccentric 6010. This part serves the function of providing an axis for the assembly including eccentric 6010 and top roller 6000 to rotate about so that increasing tension on Active Belt 3010 will cause an increase in holding forces on the active belt 3010. It also serves the purpose of connecting eccentric 6010 to release handle 2000 in a rotatable manner.

Top roller pawl 6030 can be a component within the assembly. Top roller pawl 6030 can include a cylindrical shaped portion 6031. Top roller pawl 6030 can include a tooth portion configured to mate with a complimentary feature of upper roller 6000. Top roller pawl 6030 can be configured to be acted on by a spring element 6040 to assist in maintaining engagement of top roller pawl 6030 tooth feature with the mating feature of roller 6000, such as a grooved portion. Top roller pawl 6030 can be made of common metallic, polymer, or other materials or combinations of materials and by using common methods such as machining, blanking, broaching, casting, injection molding, 3D printing, or combinations of these and/or other methods.

Top roller pawl 6030 can be held in place with common fasteners such as clips and screws as well as press fits, welding, and adhesives. Top roller pawl 6030 can facilitate preventing rotation of roller 6000 in the direction of loosening the belt, yet allowing rotation in the direction of tightening.

Bottom roller pawl 7010 can be a component within the assembly. Bottom roller pawl 7010 can include a cylindrical shaped portion. Bottom roller pawl 7010 can include a tooth feature configured to mate with a complimentary portion of bottom roller 7000. Bottom roller pawl 7010 can be configured to be acted on by a spring element to assist in maintaining engagement of the bottom roller Pawl 710 tooth feature with the mating feature of bottom roller 7000. Bottom roller pawl 7010 can be made of common metallic, polymer, or other materials or combinations of materials and by using common methods such as machining, blanking, broaching, casting, injection molding, 3D Printing, or combinations of these and/or other methods. Bottom roller pawl 7010 can be held in place with common fasteners such as clips and screws as well as press fits, welding, and adhesives. Bottom roller pawl 7010 can facilitate preventing rotation of bottom roller 7000 in the direction of loosening the belt, yet allowing rotation in the direction of tightening.

Looping is shown in cutaway in FIG. 5 with side plate 5000 and release handle 2000 and other parts. In a preferred embodiment, the present invention can be configured with second passive belt 3000 which can be secured to ratcheting buckle or belt mechanism 100 via a bolt 4000. One of ordinary skill in the pertinent art can recognize that other methods of securement are possible in the present invention. One of ordinary skill in the pertinent art can also recognize that the active end of the buckle could also be secured to a structure with or without a passive belt 3000. Both the active and passive belt are shown abbreviated for purposes of illustration. Ratchet grip handle 1000 is in its retracted position substantially flat, as is release handle 2000. The looping of active belt 3010 around and over top roller 6000, then under bottom roller 7000 and thus between the two ratcheting rollers can be seen more clearly in cutaway view FIG. 4.

FIG. 5 shows a close-up cutaway view of an embodiment of the present invention. An object of the present invention can address situations wherein if active belt 3010 is subject to tension or force pulling the ex-ante part of the active belt, top roller 6000 may tend to rotate in the clockwise direction relative to the observer of FIG. 5 about axis V-VI. Thereby, top roller 6000 can be forced against bottom roller 7000, increasing the force against active belt 3010 thus increasing grip on active belt 3010. Top roller 6000 and bottom roller 7000 can have a gripping surface, by way of non-limiting illustration, a knurled surface to improve gripping action on active belt 3010. In a preferred embodiment, bottom roller 7000 can have a ratchet system that prevents rotation in the direction of belt release via bottom roller pawl 7010. Note that the view cut in this embodiment leaves first side plate roller guide 5002 in the view. Second side plate roller guide 5012 is shown in FIG. 9. A benefit of the present invention can be to center the otherwise unrestrained bottom roller 7000 centered in translation on its axis VI-VIII and XXI-XX FIG. 4 so that interference with ratcheting handle 1000 on closure is prevented and release handle 2000 is placed into its retracted position.

FIG. 6 is a cutaway view of the ratcheting mechanism in the "release" mode to show the loosening operation.

Rollers 6000 and 7000 can be separated by loosening via such release. Active belt 3010 can be no longer held fast between rollers 6000 and 7000 and can be pulled through belt mechanism 100 in either direction.

Figure 7:
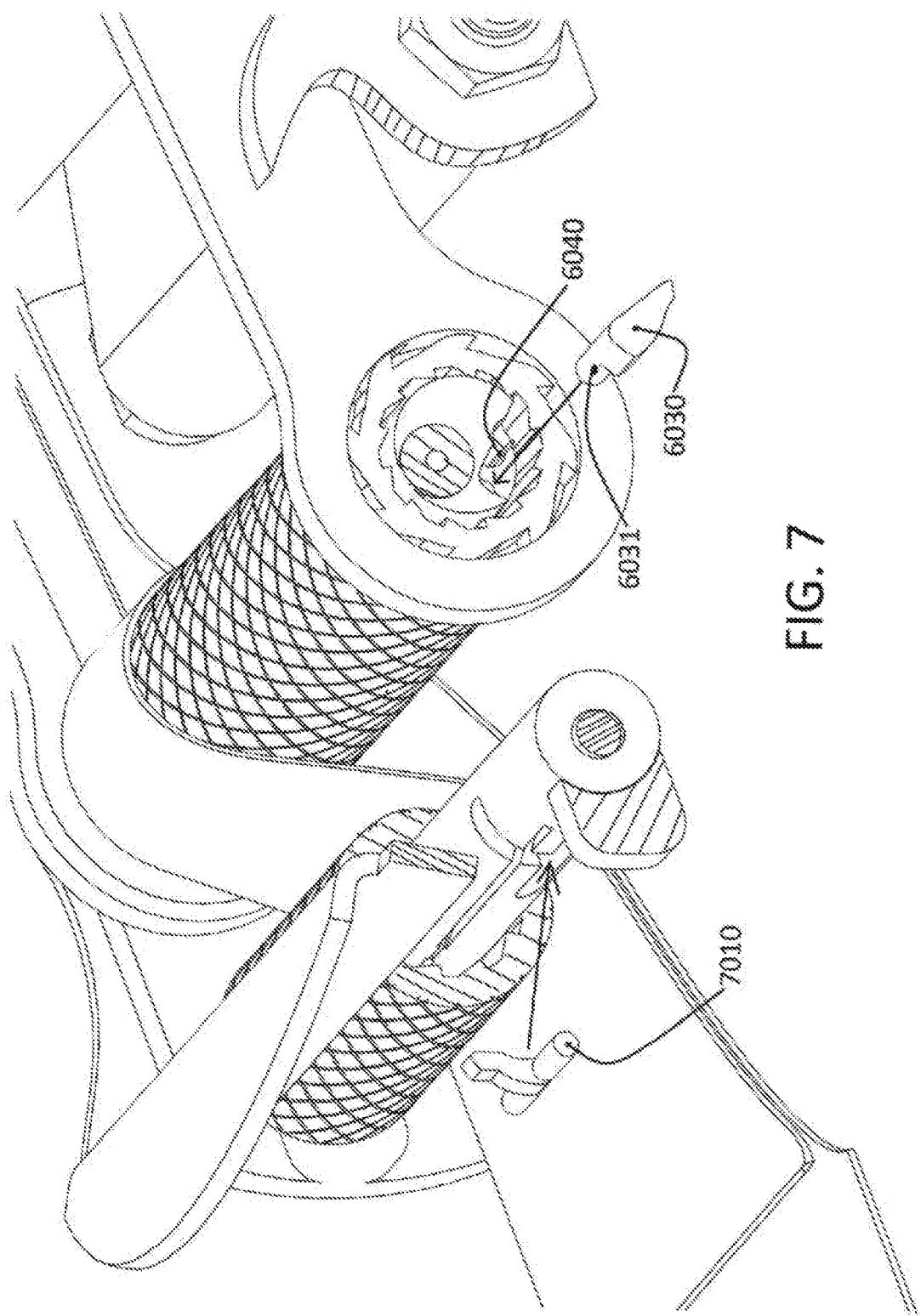
FIG. 7 is a close-up view of the ratcheting mechanism in the "release" mode with bottom roller pawl 7010 shown "exploded" outward from its position, and top roller pawl 6030 also "exploded" from its position.

FIG. 7 is a close-up view of ratcheting mechanism 100 in an exemplary release mode with bottom roller pawl 7010 shown exploded outward from its position, and top roller pawl 6030 also shown exploded from its position. Top roller pawl spring 6040 is also visible in this view.

Top roller pawl spring 6040 can be a wire or rod shaped component. It can be made by wire drawing, casting, machining, 3D printing, extrusion, molding, or other methods. It may be made of any material with elastic properties such as steel, other metals, polymers, organic or inorganic fibers, rubber, foam, or combination of these or other materials. Top roller pawl spring 6040 can also be a magnet or other element that serves the function of acting on top Roller Pawl 6030. Top roller pawl spring 6040 can facilitate top roller pawl 6030 to assist in maintaining engagement of a tooth of top roller pawl 6030 with the complimentary mating feature of upper roller 6000 and allow top roller pawl 6030 to rotate or move as required to allow the upper roller 6000 to rotate in the direction of tightening active belt 3010.

Figure 8:
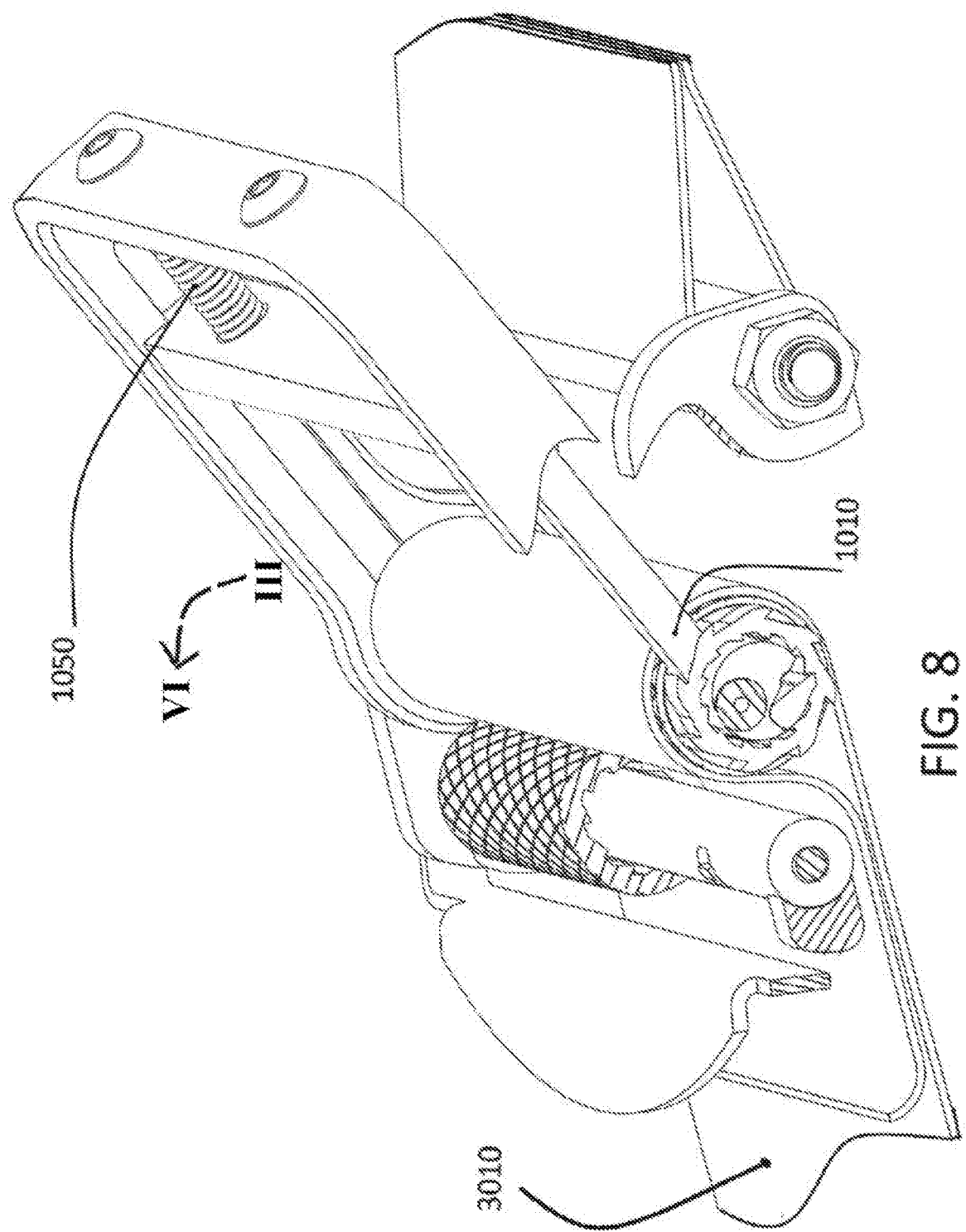
FIG. 8 is a cutaway view of the ratcheting mechanism in the tightening mode showing the detail of ratchet grip pawl 1010 engaging the outer teeth of top roller 6000 to cause it to turn, thus tightening active belt 3010.

FIG. 8 is a cutaway view of the ratcheting mechanism in the tightening mode showing detail of ratchet grip pawl 1010 engaging outer teeth of top roller 6000 to cause it to turn (counterclockwise in FIG. 8), thus tightening active belt 3010. FIG. 8 shows ratchet grip pawl 1010 with a series of features on top roller 6000 configured to fit against ratchet grip pawl 1010 and thus force top roller 6000 to rotate in the direction of tightening 3010. Ratchet grip pawl 1010 may be configured with one or more ratchet grip pawl retraction springs 1050 that assist in a secure engagement. Ratchet grip pawl retraction springs 1050 can be configured such that the user can easily return 1000 to its retracted position by squeezing ratchet grip pawl 1010 such that ratchet grip pawl 1010 can disengage from top roller 6000. Disengagement does not allow active belt 3010 to slip out; top roller 6000 can be prevented from rotating in the direction of releasing the belt by top roller pawl 6030; and bottom roller 7000 can be prevented from turning in the direction of belt release by bottom roller pawl 7010. Bottom roller pawl 7010 and top roller pawl 6030 can be configured to act against a spring such that they are always positioned to engage the appropriate anti-rotation teeth of top roller 6000 or bottom roller 7000. An embodiment of a spring acting on top roller pawl 6030 can be seen in FIG. 7 with top roller pawl spring 6040. Top roller pawl 6030, in a preferred embodiment, can be configured to fit into a cylindrical recess in top roller 6000 via its cylindrical feature, and is kept positioned to engage top roller 6000 by the force of top roller pawl spring 6040 pushing it outward rotatably about cylindrical portion 6031.

Cylindrical portion 6031 can be a cylindrical or rod shaped feature attached to top roller pawl 6030. Cylindrical portion 6031 can be made of common metallic, polymer, or other materials or combinations of materials and by using common methods such as machining, blanking, broaching, casting, injection molding, 3D printing, or combinations of these and/or other methods. Cylindrical portion 6031 can be held in place with common fasteners, by way of non-limiting illustration, clips, screws, press fits, welding, and adhesives. A benefit of cylindrical portion 6031 can be to define an axis III-IV for top roller pawl 6030 to rotate thereabout.

FIG. 9 shows the release handle in wireframe view with rotation about axis VII-VIII. Detail of cutout of radial receiver groove 5005 is shown.

What is claimed is:

1. A method of ratcheting a belt, said method:
providing a buckle;
providing a bottom roller rotatively mounted to said buckle, said bottom roller being ratcheted for rotation in a first angular direction;
providing a release handle rotatively mounted to said buckle;
providing a top roller, rotatively mounted with respect to said release handle, said top roller being ratcheted for rotation in a second angular direction opposite said first angular direction, and said top roller being moved into and out of engagement with said bottom roller by said release handle, and wherein said top roller rotates along a radius eccentric from a connective pivotal axis of said top roller with said release handle, and wherein said top roller has a ratchet wheel with a pawl along an interior of said top roller ratchet wheel to ratchet said top roller in said second direction;
providing a handle for torqueing said top roller in said second angular direction, said handle having a spring biased pawl to prevent angular movement of said top roller in a direction opposite said first direction;
providing an active belt having an end looped underneath said top and bottom rollers and around said top roller and then between said top and bottom rollers; and
wherein said active belt is pulled toward said buckle when said handle torques said top roller in said second direction and is restrained from release by said bottom and top rollers when said rollers are engaged and wherein said release handle removes said top roller from engagement with said bottom roller to release said belt.

\* \* \* \* \*